Sept. 11, 1956  L. E. LUNDQUIST, JR  2,762,221
DEVICE FOR MEASURING AIR TURBULENCE
Filed Aug. 27, 1951
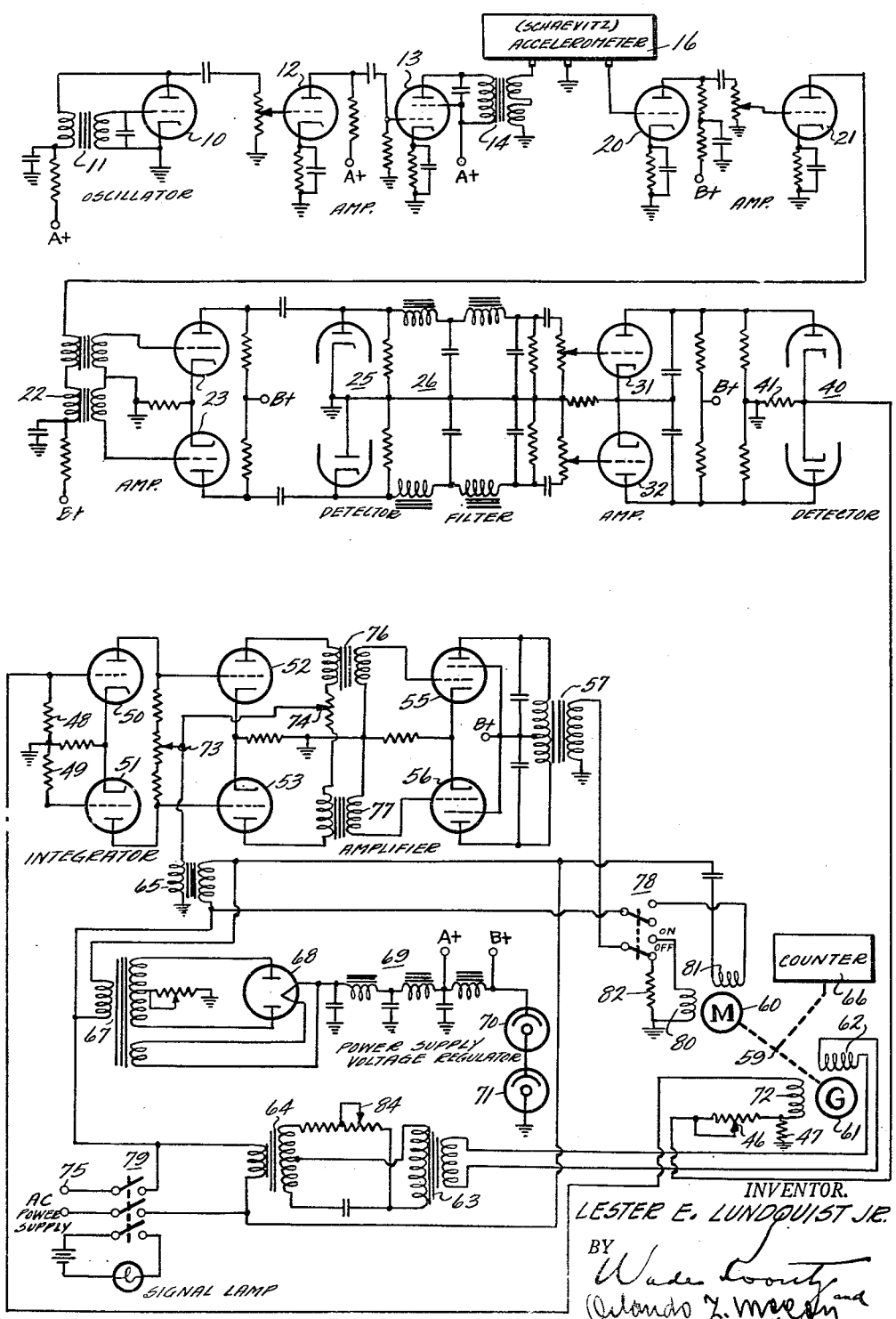
INVENTOR.
LESTER E. LUNDQUIST JR.
BY
ATTORNEYS United States Patent Office 2,762,221
Patented Sept. 11, 1956

2,762,221
DEVICE FOR MEASURING AIR TURBULENCE

Lester E. Lundquist, Jr., Dayton, Ohio, assignor to the United States of America as represented by the Secretary of the United States Air Force Application August 27, 1951, Serial No. 243,863

6 Claims. (Cl. 73—178)

The invention described herein may be manufactured and used by or for the Government for governmental purposes without payment to me of any royalty thereon.

This invention concerns an instrument for use in aviation and more particularly to an air turbulence meter for determining the average severity of turbulence in the air surrounding an aircraft.

In the past, short ribbons of flexible cloth, or the like, have indicated air flow direction at the surface of aircraft without providing detailed information concerning air turbulence as contemplated hereby.

The present invention concerns an assembly sensitive to vertical acceleration as a transient or varying force, vertical to the plane axis developed as a result of air turbulence. Steady forces, such as those developed while the aircraft is banked in a turn, will have no effect on the meter. The device comprises an oscillator, an accelerometer or sensing device mounted approximately at the center of gravity of the aircraft, and a velocity servoloop and an indicator registering air turbulence.

The object of the present invention is to provide an instrument for indicating with practical precision and dependability the severity of air turbulence in the air adjacent the surface of an aircraft as a transient or varying force acting vertically to the axis of the aircraft.

The single figure shown in the accompanying drawing is a schematic wiring diagram of a device embodying the present invention.

In the drawing a frequency of a represented two kilocycles is supplied by an oscillator comprising a tube 10 and a transformer 11. An A+ plate potential is supplied to the tube 10 through the primary winding of the transformer 11. The oscillator is capacitively coupled with an amplifier comprising the amplifier tubes 12 and 13. The two kilocycle oscillator output so amplified is passed through a coupling transformer 14 and is applied to an accelerometer 16. The accelerometer 16 preferably is a Schaevitz accelerometer described in "Proceedings of the Society for Experimental Stress Analysis" for 1947 at page 74.

The Schaevitz accelerometer briefly comprises a displaceable magnetic core that flows along the common axis of the differential transformer hollow cylindrical primary coil with similar secondary coils on both axial sides of the primary coil. The center primary coil is energized with alternating current producing a magnetic flux linking it with both of the secondary coils. The voltages induced in the outer secondary coils oppose each other. For some core positions the voltages balance. The combined output of the secondary coils at this balance point is very small. For other positions of the core the voltages induced into the secondary coils differ in an appreciable magnitude and this voltage difference from the secondary coils appears as the output voltage of the accelerometer.

The output voltage from the accelerometer 16 is impressed as a modulation voltage upon the amplified two kilocycle output from the oscillator. The amplitude of the accelerometer output is dependent upon the severity of the air turbulence at the surface of the aircraft. The modulated signal output from the accelerometer 16 is amplified in the amplifiers 20 and 21. The amplifiers 20 and 21 are coupled through a transformer 22 to a push-pull amplifier 23. Output from the push-pull amplifier 23 is applied to a duo diode tube 25 that functions as a full wave detector by removing the two kilocycle carrier and passing the turbulence indicating modulation envelope carried by the carrier.

After demodulation in the detector tube 25, the signal is filtered in the filter 26 and the modulation envelope is applied to the grids of an alternating current amplifier comprising the tubes 31 and 32 connected in push-pull. The amplified signal output from the amplifier tubes 31 and 32 is applied to a modulation detection means, such as a duo diode detector tube 40 that has as output at its cathode resistor 41 a direct current that fluctuates in conformity with the modulation impressed upon the carrier by the air turbulence at the accelerometer 16.

This air turbulence initiated fluctuating direct current at the cathode of the detector tube 40 then enters a velocity servoloop from which it appears on the dial of a counter 66 as a reading of air turbulence at the surface of the aircraft carrying the equipment. The velocity servoloop comprises the motor 60 that drives the generator 61 at a greater or less rate of speed depending upon the magnitude of an error voltage impressed by the generator 61 upon a reference voltage from an alternating current source 75 and applied to the winding 81 of the motor 60. The dash line 59 indicates a mechanical connection between the motor 60, the generator 61 and the air turbulence indicating meter or counter 66.

In the velocity servoloop circuit the cathode of the detector tube 40 is connected to the grid of an integrator amplifier tube 50 to which plate current is supplied from the alternating current power supply 75. The cathode of the detector tube 40 is associated with the generator 61 by being connected through a calibrating potentiometer 46 in series with the generator winding 72 and from the generator winding 72 to the grid of the integrator amplifier tube 50. The other generator winding 62 is supplied with alternating current from the alternating current power supply 75 through transformers 63 and 64 when a master switch 79 is closed. The transformers 63 and 64 have an adjustable potentiometer 84 between them. The junction of the generator winding 72 with the resistor of the potentiometer 46 is applied to ground through a resistor 47. The grid of the integrator amplifier tube 50 is applied to ground through a resistor 48.

The fluctuating direct current supplied by the cathode of the detector tube 40 to the generator winding 72 is maintained of small magnitude by the adjustment of the calibrating potentiometer 46 and by the values of the resistors associated with this part of the circuit. Illustratively the detector resistor 41 is 250,000 ohms, the resistor of the potentiometer 46 is 150,000 ohms, the resistor 47 is 22,000 ohms and the resistor 48 is 220,000 ohms.

The direct current voltage from tube 40 is added algebraically to the 60 cycle alternating voltage on the generator winding 72, with the generator 61 driven by the motor 60, for application to the grid of the integrator amplifier tube 50. The generator G is and operates as a variable inductor with its rotor coupled within the flux of the A. C. field of the winding 62 mixed with the flux of D. C. on A. C. in the winding 72. The integrator amplifier tube 51 has its grid applied to ground through a resistor 49 of 220,000 ohms resistance equal to that of the resistor 48.

A transformer 65 supplies plate potential through balancing control adjustable potentiometer 73 and the adjustable drift potentiometer 74 to the pairs of tubes 50 and 51, and 52 and 53, connected in push-pull. Output from the tubes 52 and 53 is passed through transformers 76 and 77 to amplifier tubes 55 and 56 connected in push-pull and that are coupled through a transformer 57 to a counter switch 78.

In its off position the counter switch 78 open circuits the motor winding 81 and passes the output from the transformer 57 to ground through a resistor 82. The primary winding of the transformer 65 is connected across one winding of a power supply voltage regulator transformer 67. The power supply voltage regulator comprises a full wave rectifier 68 connected through a filter 69 to which A+ and B+ direct current is supplied with voltage regulator tubes 70 and 71.

The counter switch 78 is a double pole double throw switch that in its on position applies the potential of the primary winding of the transformer 65 across the motor winding 81 and the output from the transformer 57 through the motor winding 80 to ground. The output from the transformer 57 carries the turbulence signal from the accelerometer 16 and effects the operation of the motor 60. The operation of the motor 60 drives both the generator 61 and the counter 66. The signal from the accelerometer 16 decrees a certain amplitude direct current voltage and the motor 60 will rotate at a speed at which the envelope of the generator alternating current voltage equals that of the direct current voltage.

It will be noted that the alternating current voltage is supplied to the plates of the tubes 50, 51, 52 and 53 in such a manner that all of their anodes have the same polarity at any one time. The grids of the tubes 50 and 51 are equally biased.

With zero signal applied from the cathode of the detector tube 40, the amplifier balancing control potentiometer 73 is adjusted to balance the tubes 50 and 51 so that their effective output is zero, causing the integrator to remain inactive.

When a direct current voltage is applied from the detector tube 40 the balance is upset and the integrator amplifier tubes 50 and 52 and the transformer 76 function to amplify the signal received from the tube 52, applying the signal through the amplifier tubes 55 and 56 to the motor 60. The integrator amplifier tubes 51 and 53 function to maintain the amplifier in the balanced or no output condition when zero signal is applied from the detector tube 40.

The generator 61 is driven by the motor 60. The generator 61 has one of its windings 72 connected in series with the input to the integrator amplifier. The output from the generator 61 operates in opposition to the direct current voltage from the detector tube 40 and its amplitude is proportional to its speed. The counting speed of the motor 60 is directly proportional to the direct current input to the integrator amplifier.

The first derivative of distance and time is speed. A direct current voltage on the cathode of the detector tube 40 is proportional to fluctuations of direct current voltages resulting from air turbulence. That direct current voltage is applied to the grid of the integrator amplifier tube 50 in series with the voltage developed by the winding 72 of the generator 61 that is driven by the motor 60.

When the error voltage is of such a magnitude as to cause a given motor speed, the generator has induced in its winding 72 an alternating current voltage which is directly proportional to this speed.

As the motor speed increases with the given error voltage, the generator output increases proportional to that increase in speed, decreasing the effective error voltage applied to the integrator amplifier tube 50 which in turn decreases the voltage applied to the motor 60 thus reducing its speed and the generator E. M. F. The inverse feed back generator is used to assure that the speed of the motor and the consequent indication on the air turbulence indicating counter 66 is a direct indication of the direct current error voltage magnitude which is a measure of the air turbulence. The voltage from the cathode of the detector 40 is always positive and hence the motor is a one-way motor.

It is to be understood that the device and its parts that are shown and described herein have been presented for the purposes of illustrating and describing a successful operative embodiment of the invention and that similarly operating modifications of the various parts of the device may be substituted for those cited without departing from the scope of the present invention.

What I claim is:

1. An air turbulence indicating device, comprising a source of carrier frequency, means amplifying the carrier frequency, an accelerometer applying a turbulence originated modulation to the carrier from said carrier frequency source, means amplifying the turbulence modulated carrier frequency, means detecting the modulation on the carrier, an alternating current power supply line, a generator having a first winding connected in series with said modulation detecting means, said generator having a second winding to which an alternating current is applied, and said generator having a rotor the speed of which controls the inductive coupling between the first and the second generator windings, integrator amplifier tube means having a plate electrode to which is supplied alternating current plate potential from the line and having a grid electrode to which the output from the first winding of said generator is applied in series with the output from the modulation detecting means, an integrator transformer means having an input derived from the output from said integrator amplifier tube and having an output, a motor to a first winding of which is supplied alternating current from the line and to a second winding of which motor the output from said integrator transformer means is applied and said motor driving said generator through a mechanical coupling, and an air turbulence indicating counter driven by said motor through the mechanical coupling.

2. An air turbulence indicating device, comprising a source of carrier frequency, an accelerometer applying an air turbulence originated modulation to the carrier from said carrier frequency source, air turbulence modulation amplifying means receiving as its input the air turbulence modulated carrier and having an output, a detector tube receiving as its input the output from the air turbulence modulation amplifying means and having a cathode at which appears a direct current of an amplitude simulating the magnitude of air turbulence to which said accelerometer is exposed, and a velocity servo-loop comprising a constant frequency alternating current power source, a generator having a first winding to which is applied the air turbulence simulating direct current from the cathode of said detector tube and the generator having a second winding, a variable phase shifting circuit containing a capacitor shunted adjustable potentiometer connected in circuit between said alternating current power source and said generator second winding, a motor having a first winding energized by a constant frequency alternating current from the power source and the motor having a second winding, a direct current amplifier integrator smoothing circuit deriving its input from the generator first winding and having an output modulation originating at the accelerometer, amplifier means transformer coupled with said integrator smoothing circuit for amplifier means input and transformer coupled with the motor second winding for imparting to the flux of the motor second winding an integrated modulation originating at said accelerometer, and a counter driven along with the generator by said motor and indicating successive occurrences of acceleration to which the accelerometer is exposed and the relative magnitudes thereof.

3. An instrument for registering air turbulence to which an aircraft is subjected as indicated by a Schaevitz type accelerometer installed at substantially the center of gravity of the aircraft, comprising an accelerometer, means supplying a carrier of constant frequency and desired amplitude to the accelerometer which impresses upon the carrier an acceleration indicating modulation envelope, modulation first detection means removing the modulation envelope from the carrier, amplifying means adjusting to a desired magnitude the modulation envelope, second detection means providing a wave of fluctuating direct current proportional to the amplitude of and phased with the modulation envelope, a servo system comprising mechanically coupled generator and motor components with their windings to a first generator winding of which the acceleration indicating wave of fluctuating direct current is applied, integrator circuitry means receiving as input the acceleration indicating wave of fluctuating direct current after it has passed through the generator first winding and the integrator circuitry means passing its output to a motor first winding, an alternating current power supply, a servo system motor second winding energizing circuit connected to the alternating current power supply, a servo system generator second winding energizing circuit connected to the alternating current power supply, and counter means actuated from the mechanical coupling between the generator and the motor and indicating the occurrence of and the relative magnitude of the acceleration forces to which the aircraft is subjected as indicated by the accelerometer at the center of gravity thereof.

4. The air turbulence registering instrument in claim 3 wherein a calibrating potentiometer is connected in series in the input to the generator first winding to which the acceleration indicating wave of fluctuating direct current is applied for adjusting the magnitude of the wave.

5. The air turbulence registering instrument in claim 3 wherein a capacitor shunted adjustable potentiometer in the alternating current power supply to the second winding of the generator introduces a variable phase shifting function.

6. The instrument defined by the above claim 3 inclusive of a condenser means connected in series between the motor second winding and the power supply, and transformer means connected between the generator second winding and the power supply.

References Cited in the file of this patent
UNITED STATES PATENTS 2,266,449     Ulrich et al. _____ Dec. 16, 1941

OTHER REFERENCES

Electronic Instrument, Greenwood, Holdam and Mac-Rae, McGraw Hill, New York, 1948, Figs. 14, 12, pp. 487 and 488.